United States Patent Office 3,709,829
Patented Jan. 9, 1973

3,709,829
CATALYST COMPOSITION
Edward James Gasson, Dollar, Scotland, assignor to
BP Chemicals Limited, London, England
No Drawing. Filed Oct. 6, 1970, Ser. No. 78,574
Claims priority, application Great Britain, Oct. 13, 1969,
50,076/69
Int. Cl. B01j *11/06*
U.S. Cl. 252—461
3 Claims

ABSTRACT OF THE DISCLOSURE

The present invention relates to catalyst compositions containing antimony together with one or more polyvalent metals, the antimony being introduced in two stages, initially as a tetroxide and then as a trioxide, the two types being present in specific proportions, the total mixture being subjected finally to a heat treatment in the presence of molecular oxygen.

This invention relates to catalytic compositions and in particular to catalytic compositions containing antimony for use in oxidation reactions of organic compounds.

British patent specification No. 961,361 (The Distillers Company Limited) describes and claims a catalytic composition comprising antimony tetroxide in combination or in admixture with stannic oxide and in admixture with antimony trioxide in proportion in the range 5 to 50% by weight of the total mixture, the mixture having been heated to a temperature in the range 550 to 1100° C. in the presence of a molecular oxygen containing gas. According to one embodiment described in that specification the composition may be prepared by mixing together any of the oxides of antimony and tin or substances yielding these oxides under the conditions of a subsequent heat treatment, heating the mixture in the presence of molecular oxygen at a temperature in the range 550 to 1100° C., grinding the mixture to a granule size less than 30 mesh B.S.S. forming an aqueous slurry of the ground mixture with antimony trioxide, drying the mixture at 50 to 200° C. and heating it in the presence of molecular oxygen at a temperature in the range 550 to 1100° C. The catalyst composition according to the invention of the specification possesses increased physical hardness and a higher catalytic activity in oxidation reactions than was hitherto obtainable.

It has now been found advantageous to modify the method of producing the catalytic composition described in British patent specification No. 961,361 and to extend the application of the invention to other antimony containing catalyst compositions.

Accordingly, the present invention is a catalytic composition which comprises an oxide composition containing antimony together with one or more polyvalent metals prepared by mixing together antimony tetroxide or a substance yielding this oxide under conditions of subsequent heat treatment together with an oxide or oxides of one or more polyvalent metals, or substances yielding the oxide under conditions of subsequent heat treatment, washing the mixture to remove any acids, bases or salts introducing antimony trioxide into the mixture in amount of at least 10% by weight and heating the mixture in the presence of molecular oxygen at a temperature in the range 550 to 1100° C.

By the term "polyvalent metals" used herein is meant metals which exhibit more than one valence state. Examples of the polyvalent metals which may be present in the catalytic composition in addition to the antimony are tin, iron, copper, nickel, chromium, bismuth, molybdenum, uranium, tungsten, cobalt, manganese, or vanadium or mixtures of such metals.

The substances yielding antimony tetroxide or the oxides of the polyvalent metals under the conditions of the heat treatment may be hydrated oxides or hydroxides of antimony or the respective polyvalent metals.

The antimony trioxide may be introduced into the composition in any convenient manner and at any time during the preparation of the composition, after the completion of the washing stages prior to the heating step. Thus antimony trioxide may be added as such to the wet oxide composition during or after the final wash or it may be added to the dried powder before pelleting. Alternatively some of the tetravalent antimony present in the composition may be reduced by means of a suitable reducing agent, to form antimony trioxide, the composition being thereafter subjected to the heat treatment.

The amount of antimony trioxide introduced into the mixture on composition is at least 10% by weight and is suitably in the range 10 to 50% by weight.

The catalytic compositions of the present invention possess increased hardness in comparison to catalytic compositions prepared without the addition of antimony trioxide in the manner specified. Alternatively, it is found that by employing low compression pressures during the subsequent pelleting or extrusion of the composition to produce pellets, pellets of a normal hardness but with an appreciably lower bulk density and greater porosity are produced. Such a reduction in the catalyst density effects a considerable saving in the catalyst costs, and the increased porosity improve yields and heat- and mass-transfer within the pellets.

The catalytic compositions of the present invention find application in catalysing the vapour phase oxidation of olefines such as propylene or isobutene to produce unsaturated aldehydes e.g. acrolein or methacrolein or the vapour phase oxidation of such olefins or their corresponding aldehydes to produce unsaturated acids e.g. acrylic or methacrylic acids. The compositions may also be used to catalyse the "ammoxidation" reactions of olefines or their corresponding unsaturated aldehydes with ammonia and molecular oxygen to produce unsaturated nitriles e.g. propylene or acrolein to give acrylonitrile and isobutene or methacrolein to give methacrylonitrile.

The present invention is illustrated with reference to the following examples:

EXAMPLE 1

Catalyst 1(a) was prepared as follows: Antimony trioxide (3285 g.) was added with stirring to a heated (100° C.) mixture of 70% nitric acid (1.881) and water (7.51) and then powdered tin (675 g.) was added at 100° over 15 minutes. The mixture was cooled to 40° and filtered. The filter cake was re-suspended in water (6.51) and ferric nitrate ($Fe(NO_3)_3.9H_2O$—577.5 g.) was added in 2 l. water. The mixture was heated to 50° with stirring, and aqueous ammonia was then added until the pH reached 7.0. The product was cooled, filtered and washed with water on the filter. The cake was re-suspended in water (101) stirred for 15 minutes, filtered and again washed with water on the filter. The cake was dried at 120° C. and passed through a 30 mesh sieve.

Catalyst 1(b) was prepared in the same way as Catalyst 1(a), except that 80% of the antimony trioxide (2628 g.) was added at the start of the preparation, and the remaining 657 g. was added with stirring during the final washing operation in 101 of water.

Catalysts 1(a) and 1(b), were pelleted to 4mm. x 4mm. cylinders and heat treated. In the heat treatment, the temperature was raised by 20°/hour to 830° C., and it was maintained at 830° for 16 hours.

The crush strengths of the pellets were measured by applying pressure across the diameter of the pellet, and noting the pressure at which the pellet disintegrated. Recorded figures are averages of 50 determinations. The figures found for the crush strengths of these catalysts are shown in Table 1.

TABLE 1

| Catalyst | Crush strength (lbs.) | |
|---|---|---|
| | Raw pellets | Heat treated pellets |
| 1(a) | 8 | 23 |
| 1(b) | 3 | 40 |

When these catalysts were used for the ammoxidation of propylene in a 10′ x 1 in. steel reactor, they all produced similar yields of acrylonitrile under similar conditions. Bulk densities were:

1(a)—2.22 g./ml.

1(b)—1.81 g./ml.

EXAMPLE 2

Catalyst 2(a) was prepared as follows: Antimony trioxide (3285 g.) was added with stirring to a heated mixture of 70% nitric acid (1.881) and water (7.51) and then powdered tin (889.5 g.) was added at 100° over 15 minutes. The mixture was cooled to 40° and filtered. The cake was re-suspended in water (6.51) and copper nitrate $(Cu(NO_3)_2 \cdot 3H_2O$—454.5 g.) in water (1 l.) and ferric nitrate $(Fe(NO_3)_3 \cdot 9H_2O$—760.5 g.) in water (1 l.) were added. The mixture was heated to 50° with stirring and aqueous ammonia was added until the pH reached 6.3. The preparation was continued as in Example 1.

Catalyst 2(b) was prepared in the same way as Catalyst 2(a) except that the addition of 50% of the antimony trioxide was delayed until the final water wash.

After pelleting, Catalysts 2(a) and 2(b) were heat treated to 800° C.

The figures found for the crush strengths of the catalysts are shown in Table 2.

TABLE 2

| Catalyst | Crush strength (lbs.) | |
|---|---|---|
| | Raw pellets | Heat treated pellets |
| 2(a) | 6.8 | 14.4 |
| 2(b) | 2.7 | 33.3 |

I claim:
1. In a process for the preparation of a catalyst composition comprising an oxide composition containing antimony together with an oxide or oxides of one or more polyvalent metals selected from the group consisting of tin, iron, copper, nickel, chromium, bismuth, molybdenum, uranium, tungsten, cobalt, manganese and vanadium, the improvement which comprises mixing together antimony tetra-oxide or a substance yielding this oxide under conditions of subsequent heat treatment, together with an oxide or oxides of one or more of the said polyvalent metals or substances yielding such oxides or oxides under conditions of subsequent heat treatment, washing the mixture to remove any acids, bases and/or salts, introducing antimony trioxide into the mixture in an amount of at least 10% by weight after or during the final washing and before any heat treatment, and then heating the mixture in the presence of molecular oxygen at a temperature in the range of 550° to 1100° C.

2. In a process according to claim 1 wherein the substances yielding oxide or oxides under subsequent heat treatment are hydrated oxides or hydroxides of antimony or the polyvalent metals.

3. In a proces according to claim 1 wherein the amount of antimony trioxide introduced into the composition is in the range 10–50% by weight of the total mixture.

References Cited

UNITED STATES PATENTS

| 3,258,432 | 6/1966 | Gasson et al. | 225—461 |
| 3,387,038 | 6/1968 | Koch | 252—461 |
| 3,574,729 | 4/1971 | Gasson | 252—456 X |

CARL F. DEES, Primary Examiner

U.S. Cl. X.R.

252—467, 471, 472, 476